United States Patent [19]

Renk et al.

[11] Patent Number: 5,082,089
[45] Date of Patent: Jan. 21, 1992

[54] TRACTION MOTOR SUSPENSION BEARING LUBRICATOR

[75] Inventors: Richard J. Renk; George E. Boller; Richard M. Ebert, all of Winona, Minn.

[73] Assignees: Carol Ann Mackay; Helen Lou Kurtz, both of Winona, Minn.

[21] Appl. No.: 271,017

[22] Filed: Nov. 14, 1988

[51] Int. Cl.⁵ .............................................. F16N 7/12
[52] U.S. Cl. ..................................... 184/64; 184/102; 384/409
[58] Field of Search ............... 184/16, 3.1, 3.2, 64, 184/100, 102, 109, 19, 22, 25, 99; 384/171, 172, 173, 409, 410

[56] References Cited

U.S. PATENT DOCUMENTS

| | | | |
|---|---|---|---|
| 2,980,472 | 4/1961 | Harkenrider | 384/409 |
| 3,210,138 | 10/1965 | Boller et al. | 384/409 |
| 3,827,769 | 8/1974 | Boller et al. | 384/409 |

Primary Examiner—Ira S. Lazarus
Assistant Examiner—A. Cariaso
Attorney, Agent, or Firm—Richard J. Renk

[57] ABSTRACT

A device for applying lubricant to a rotatable journal having a lubricating body is biased for movement toward the journal along a defined path. Movement of the lubricating body toward the journal is controlled by a low wear, fast-disconnect retaining mechanism.

47 Claims, 3 Drawing Sheets

TRACTION MOTOR SUSPENSION BEARING LUBRICATOR

FIELD OF INVENTION

The invention relates to lubricators for applying oil to a rotatable shaft and more particularly to lubricators such as used in conjunction with locomotive traction motor suspension bearings.

BACKGROUND OF THE INVENTION

Lubricator of the type used to lubricate locomotive traction motor suspension bearings are subjected to extreme vibration and shock due to rail joint and gear loading conditions. With increasing locomotive horsepower and speed, the vibration and resulting wear conditions have been vastly accelerated.

While lubricators such as shown in U.S. Pat. No. 2,980,472, 3,210,138, and 3,827,769 have functioned very well, it is desireable to have lubricators wherein less wear is developed as well as having the ability to be disassembled quickly during short duration locomotive service stops to replace the lubricating element.

SUMMARY OF THE INVENTION

The present invention provides a traction motor lubricator which eliminates many of the wear areas of the presently used devices by eliminating many of the individually mounted spring retaining bushings, mounting and stop pins, and other separate parts which have a tendency to vibrate and wear.

Another feature of the invention resides in a novel retaining and travel limiting mechanism which provides for positive retention of the lubricating element and control of its movement. The retaining mechanism is easily actuated in service to allow for quick removal of the lubricating element so that the equipment it is installed on, such as a locomotive, can be quickly returned to service with a minimum of costly unproductive time.

DETAILED DESCRIPTION OF INVENTION

Figure 1:
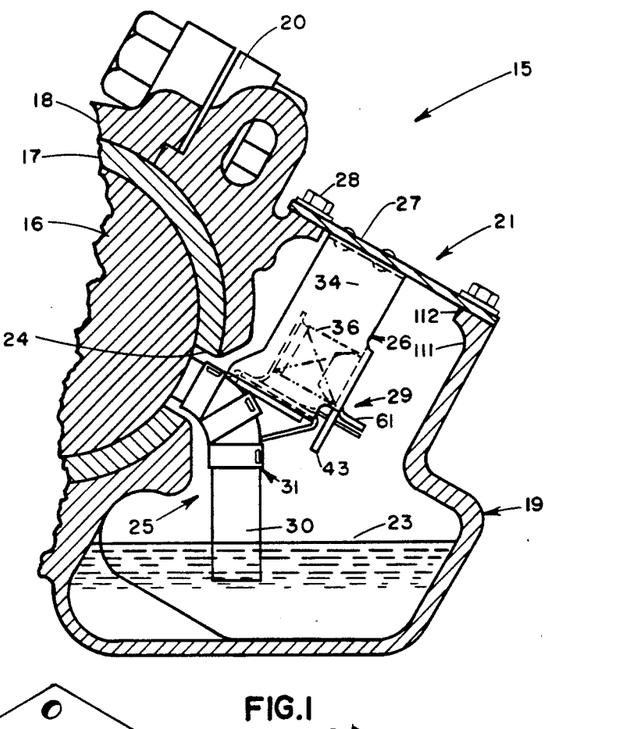
FIG. 1 is a transverse vertical sectional view of a traction motor axle support bearing showing a lubricator device of the invention.

Referring now to FIG. 1 of the drawings, reference numeral 15 generally indicates a familiar form of diesel locomotive traction motor suspension bearing assembly. In a conventional installation, a traction motor is supported, in part, on an axle 16 by suspension bearings 17 clamped in place against the traction motor frame 18 by axle caps 19 held by bolts 20.

The improved lubricator device or assembly of the invention is generally indicated at 21 and is employed to lift oil from the axle cap reservoir 23 and apply it to the axle 16 through the window opening 24 in the bearing 17.

The lubricator device 21 comprises a wick element or assembly 25 suspended from a carrier support 26 which includes a cover plate 27 for attachment to the axle cap 19 by appropriate bolts 28. The wick assembly 25 is held on the carrier assembly by a retaining means or mechanism 29.

Wick assembly 25 comprises a lubricating body or wick 30 (FIGS. 1 and 4) received in a tubular housing, trough, or holder member 31 that includes a slide member 32 (FIG. 4) which is mounted on trackways 33 formed by the side support members 34 of the carrier assembly 26. The wick assembly 25 is urged through the bearing window 24 and into contact with the axle 16 by biasing means 36 (FIGS. 1 & 7) such as compression springs.

The lubricating body or wick 30 comprises a blocklike body such as felt. The body 30 has an arcuate applicator surface 37 which may be secured in place within the holder 31 by appropriate rivets.

Carrier 26 includes the cover plate 27 to which are secured (as by riveting) the spaced side support members 34 in the form of hangers each of which includes a pair of laterally and inwardly directed flanges to form trackways 33. The flange portions 33 should have the positioning required to guide the wick assembly 25 along a radii of the journal and in a path that is perpendicular to the surface of the journal.

Figures 4, 5, 6, 7, 8:
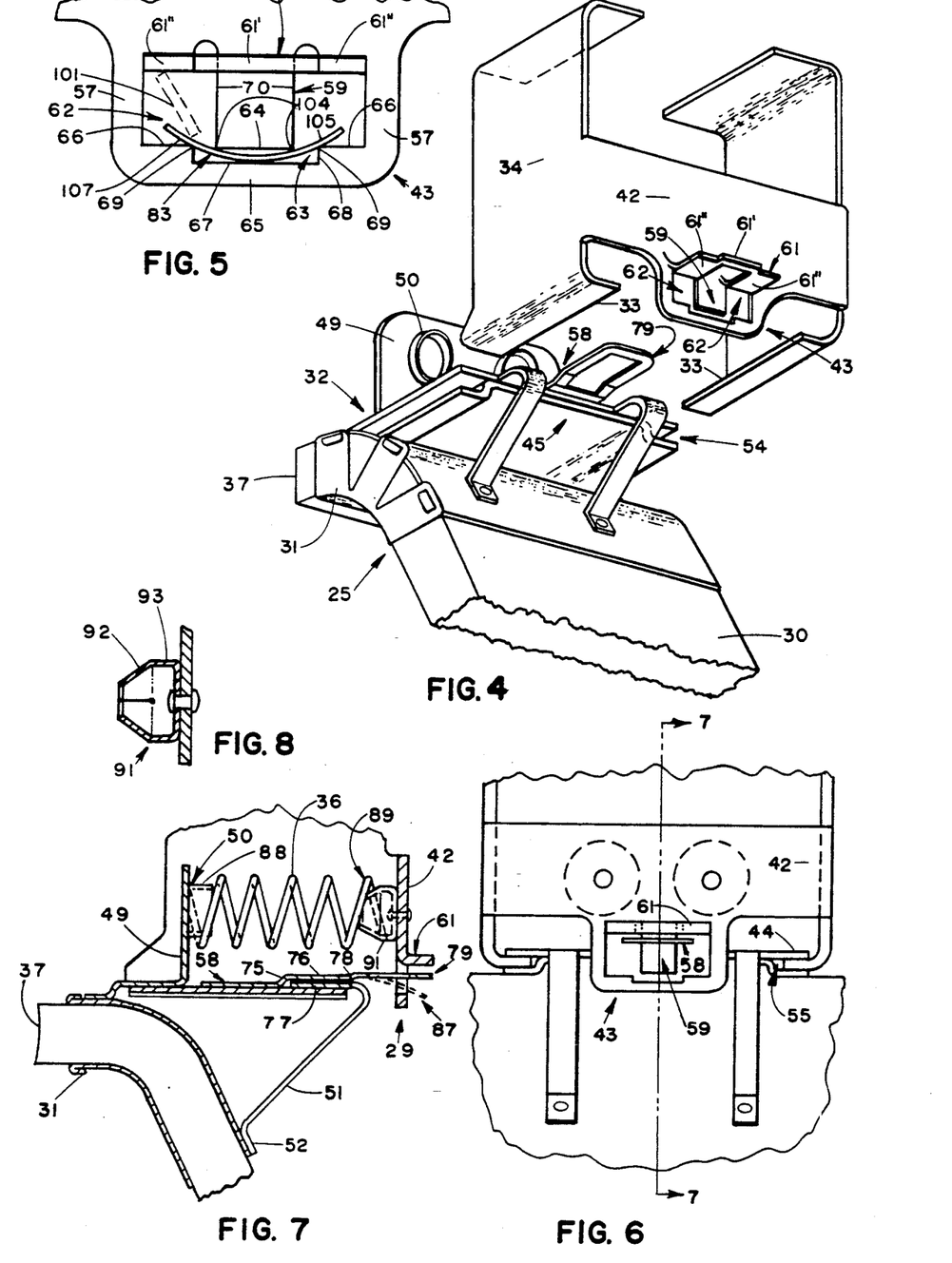
FIG. 4 is a diagrammatic perspective view of the major portions of the lubricator device.
FIG. 5 is an enlarged fragmentary view from the rear side of the lubricator device showing the portion of the retaining mechanism of the invention as viewed from the rear side of the device during installation of a wick assembly onto a support carrier.
FIG. 6 is a partial rear view of the lubricator device showing the wick assembly mounted on a support carrier and latched in place.
FIG. 7 is a fragmentary vertical sectional view of the lubricator device taken generally along lines 7—7 of FIG. 6.
FIG. 8 is a fragmentary enlarged sectional view of a spring holder of the lubricator device as may be seen in FIG. 7.

As part of the carrier 26, the side support members 34 may be joined by a rear side wall or bar member 42 that is disposed substantially at right angles to the side members. Depending downwardly from the central part of the rear wall is an extension in the form of a guard or frame 43 (FIGS. 1 and 4) which forms part of the retaining means or mechanism 29 holding the wick assembly 25 on the carrier 26 (to be discussed later). Referring to FIG. 4 it will be noted that the wall 42 is spaced upwardly away from the rear end of the respective trackways 33 so as not to interfere with movement of the wick slide member 32.

Figure 9:
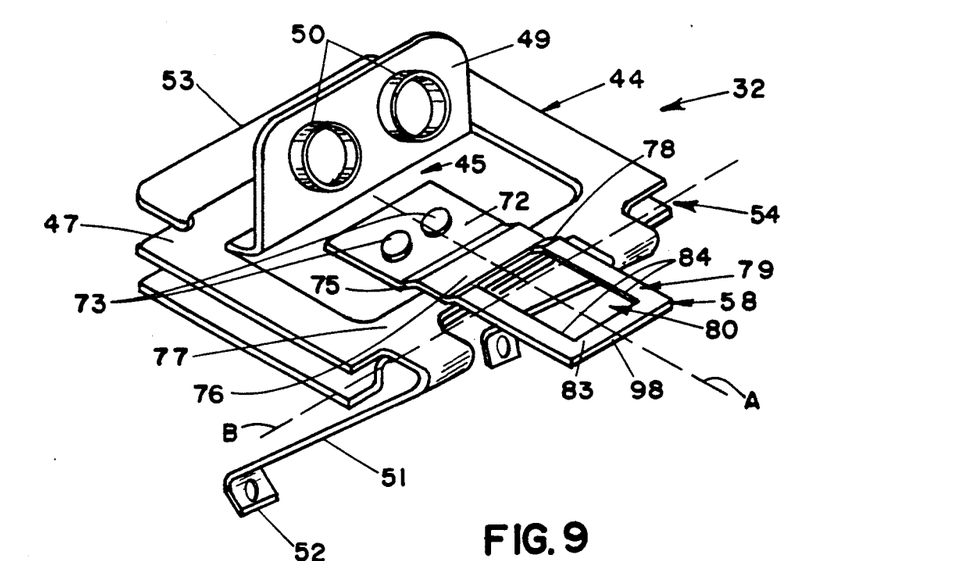
FIG. 9 is an enlarged perspective view of the wick assembly's slide member which shows a portion of the retaining and travel limiting mechanism.

As shown in FIG. 9, the wick slide member 32 generally comprises a top plate 44 and a bottom plate 45 (FIG. 4) affixed together as by riveting or spot welding (not shown). The top plate 44 defines a planar top surface 47 from which is bent an upwardly extending tongue or abutment 49. As will be apparent from FIG. 9, the tongue is formed at an approximate right angle to the plane of the slide plate's top surface 47 (and the plane of movement of the slide member 32 along the trackways 33). Extending from the tongue 49 toward the rear wall 42 of the carrier are spring retaining or positioning holders 50.

The top plate 44 also includes angled legs 51 that are provided with feet 52 which rest on and are secured to the top of the wick holder 31. The slide top plate 44 also has a lip 53 (FIGS. 7 and 9) extending toward the front of the lubricator which is also riveted to the wick holder 31.

To enable the slide member 32 to be guided on the carrier trackways 33, the slide top 44 and bottom 45 between them form channels 54 (FIG. 9). A slight lateral clearance 55 (FIG. 6) is provided between the channel walls and the trackways 33 to allow for articulation and seating of the wick face 37 against the axle 16 in the event of some misalignment.

As an important feature of the invention, there is provided a novel retaining means or mechanism indicated generally at 29 (FIGS. 1 and 7) for enabling the wick assembly 25 to be quickly installed and removed from the carrier 26. This is of particular significance in todays high speed rail service because of the need to keep locomotive down-time to a minimum when it becomes necessary to change a wick assembly because of maintenance requirements.

The retaining means 29 may include complementary portions carried by the wick assembly member 25 and the carrier or support member 26. Specifically, the retaining means indicated at 29 may include a deflectable or latch means such as a latch spring 58 (FIG. 9) carried by the wick assembly slide member 32, and a catch means of the carrier 26 which may include a tab or finger projection 59, a guard or frame 43 and a protruding ledge or protective shelf 61. As shown in FIG. 4, tab 59 is formed as a downward projection of the rear wall 42 and is formed by shearing out and bending the ledge 61 rearwardly at an approximate right angle to the plane of the rear wall 42. In effect, shearing of the ledge 61 leaves a somewhat U-shaped opening or window 62 (FIG. 5) around three sides of the tab 59. The ledge 61 is shown to have a tie-bar 61' connected between individual shoulders 61". In some instances the tie-bar 61" may be trimmed leaving the individual shoulders 61".

For a purpose to be discussed later, the generally U-shaped opening or window 62 (FIG. 5) surrounds tab 59 and is defined on its outer sides by legs 57 of the guard 43 and on its base by the lower wall or leg 65. There thus is provided a space such as a narrow aperture in the nature of a gap or slot 63 generally between the end 64 of the tab 59 and the horizontally disposed lower wall 65 of the guard 43. The lower wall area 63 includes a notch 74 which provides a recess under the tab end 64. Specifically, the notch 74 has a bottom 67 which meets somewhat vertically disposed side walls 68 forming tips 69 at the point of meeting offset lands 66 of the lower wall 65. Tips 69 of the notch are positioned slightly wider than the side walls 70 of the tab 59. The U-shaped opening is thus generally defined on its inner perimeter by the tab sides 70 and end 64 and on its outer perimeter by the lower wall 65 (lands 66, notch bottom 67, etc.) and by side walls 57, with the tab 59 extending into the center of the "U".

In a typical application the lands 66 may be approximately ⅛" above the level or plane of the notch bottom 67, and the level or plane of the tab end 64 may be displaced approximately 1/16" above the level of the lands 66 (or approximately 3/16" above the notch bottom 67). The width of the tab 59 between the sidewalls 70 may be approximately ½" and the notch 74 between sidewalls 68 may be approximately ⅝ wide.

Referring now to the deflectable latch spring 58, as may be seen in FIGS. 7 and 9, it is mounted in cantilever fashion (within the cavity formed by shearing out of the spring holder tongue 49) with its base 72 secured by rivets 73 to the slide bottom 45. The spring 58 may be in the form of a relatively thin leaf spring and generally rectangular in plan view. The spring base 72 thus nests against the top of the slide plate bottom 45 which is exposed as the tongue 49 is bent upwardly from the slide plate top 44. As viewed along a longitudinal side edge of the deflectable spring 71 (FIGS. 7 and 9), the spring is offset as at 75 to enable a flat section 76 thereof to pass over the rear leg 77 of the slide top 44. The flat 76 may be positioned to extend relatively close to and be somewhat co-extensive with the width of the slide plate leg 77 so as to provide a bearing or fulcrum contact area when the spring is deflected as will be discussed later.

Figure 10:
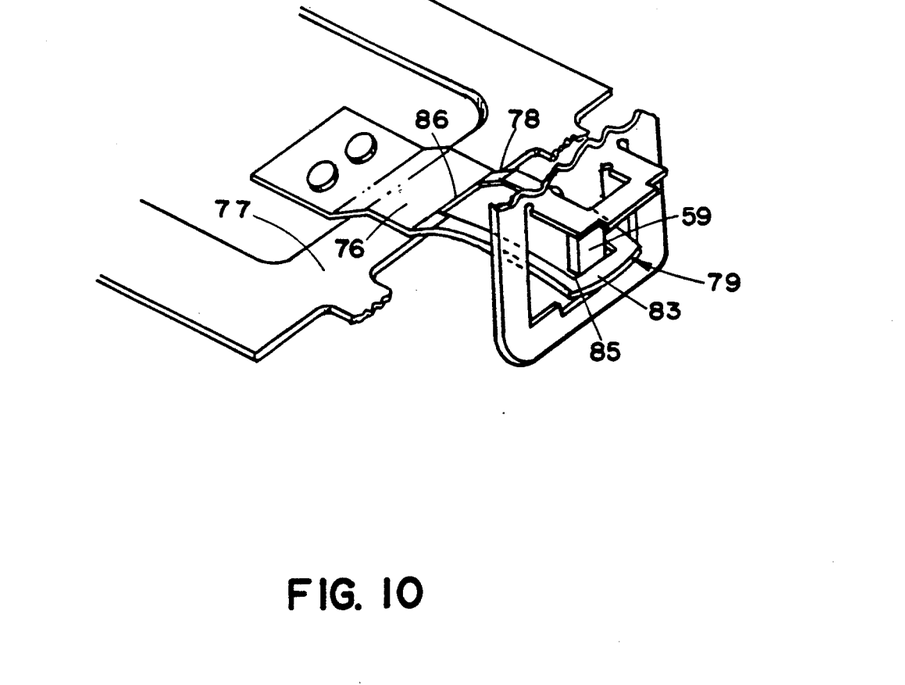
FIG. 10 is an enlarged fragmentary perspective view of a portion of the retaining mechanism showing how it may deflect during installation of the wick assembly onto a support carrier.

After passing over the slide plate leg 77, the deflectable latch spring 58 has a second offset as at 78 to provide a free or bendable end-section 79 having a relieved area such as a hole 80 therein. In other words, the plane of the generally unsupported free section 79 is disposed upwardly from the plane of the flat 76, which in turn is disposed above the plane of the attached base end 72. The hole 80 may be rectangular and is shaped to cooperate with the carrier's rear wall tab 59 to provide a travel limiting or stop means (to be discussed later). The hole 80 is defined by a rear cross bar 83 having an internal edge 85, two side legs 84 and a front edge 86 (FIG. 10) which is positioned close to the start of the second offset crimp indicated at 78. As shown in FIG. 10, during installation of the wick assembly to be discussed below, the latch spring and 79 may be deflected or bent downwardly as shown by the dotted line position 87 (FIG. 7) while the flat section 76 bears against the slide plate top leg 77.

Now, when installing the wick assembly 25 onto the carrier 26, the biasing springs 36 are initially slid over the positioning spring holders 50 carried by the slide plate tongue 49. Spring holders 50 may be formed as an integral part of the tongue by extruding a cylindrical wall 88 (FIG. 7) rearwardly toward the carrier rear wall 42. The outside diameter of the cylindrical wall 88 is preferably such that it provides a slight interference fit with the inside diameter of the springs 36 so that the springs will be held on the spring holders 50 as the wick assembly 25 is slid onto the carrier 26. This eliminates the need to manually hold the springs on the wick assembly while trying to align the wick slide channels 54 with the carrier trackways 33 during mounting. In other words, the wick assembly 25 with the biasing springs 36 retained in place forms a type of cartridge for ease of mounting onto the carrier 26.

As the wick assembly 25 is being slid onto the carrier 26, the slide tongue 49 with the springs 36 held thereon, extends upwardly between the spaced apart carrier trackways 33. The rearwardly facing spring ends 89 (FIG. 7) are then able to slide over locating spring holders 91 carried on the carrier rear wall 42. Since this installation may be somewhat "blind", to provide for positive registration and alignment of the springs 36, the rear holders 91 are formed with a tapered or truncated bullet shaped nose 92 (FIG. 8) to provide lead-in.

The tapered nose 92 is then followed by a cylindrical section 93 which may have an axial length of approximately ⅜" to ½" long extending forwardly toward the tongue spring holders 50. The outside diameter of the cylindrical section 93 is preferably slightly smaller than the inside diameter of a spring 36 to allow the spring to slide on easily but yet provide sufficient bearing surface to keep the spring properly located even under severe vibration and shock as encountered in rail service.

Thus, as the wick assembly 25 (with the springs 36 retained on the spring holders 50) is slid onto the trackways 33, the rear ends 89 of the springs will be self locating as they slide over the tapered ends 92 of the rear spring holders 91. Preferably the springs 36 are positioned just above the slide plate top 44 (FIG. 9) and the latch spring 58 with the central longitudinal axis' of the spring 36 being disposed along a plane generally parallel to the path or plane of the travel of the wick assembly toward the axle 16 as defined by the carrier trackways 33.

Because safety is a vital concern, particularly in locomotive service, it is extremely important that the wick member 25 be securely retained on the carrier member 26 while permitting fast removal for inspection or replacement so as to enable a locomotive to be returned quickly to service. Now, as a significant feature of the invention, the retaining means 29 (FIG. 1) provides for fast assembly and removal of the wick assembly 25, but yet guards against accidental dislodgement of the wick member from the carrier 26.

Operation of the retaining means 29 may be seen when viewing FIGS. 4, 5, 7 and 10. As shown therein, during installation of the wick assembly 25 onto the carrier trackways 33, the latch spring 58 has its free end 79 extending rearwardly beyond the rear leg 77 of the slide member 32. In a typical application, as shown in FIGS. 5, 7, and 9, the latch spring 58 in plan view is relatively flat with the general plane of its wide or flat sides (except for the small offsets 75 and 78) being generally parallel to the plane of movement of the wick assembly along the carrier 26 as defined by the carrier trackways 33 and the wick slide channels 54.

For purposes of interacting with the latch spring 58, the carrier's tab 59 (FIGS. 4 and 7) projects downwardly to extend through and intersect the plane of the latch spring's free end 79 when the latter is in its normal position as shown by solid lines in FIG. 7. In other words, as the wick assembly 25 is being slid onto the trackways 33, the latch spring's rear edge 98 in its normal position (FIG. 9) would strike the tab 59.

In order for the latch spring's rear cross bar 83 to pass the tab 59 so the tab can extend into the latch spring's relieved area or hole 80, it is necessary to deflect the latch spring 58 downwardly. For this purpose, a screw driver or other wedge tool indicated by dotted lines at 101 (FIG. 5) may be inserted from the back side of the carrier wall 42 between the underside of the ledge 61 and the latch spring's rear bar 83. The latch spring's free end 79 is then bent or deflected downwardly as at 87 in FIGS. 7 & 10 to enable the spring's rear bar 83 to generally align with the narrow restricted entry aperture or space provided between the tab 59 and the guard frame's lands 66 and notch bottom wall 67.

With continued wedging by the tool 101, the latch spring 58 may be made to bow or deflect about a first axis "A" (indicated generally by dotted lines in FIG. 9) extending somewhat parallel to the axis of movement of the wick toward the axle 16 as defined by the carrier trackways 33; the latch spring 58 may also bow or deflect about a second axis indicated generally by dotted lines "B" (FIG. 9) somewhat transverse to the axis "A". In other words, the latch spring 58 may, in effect, bow or arch out of its normal plane (FIGS. 4, 7 and 9) in two directions as the spring's rear bar 83 is inserted into the space between the tab 59 and the guard frame 43. When viewed from the back side of the lubricator (FIG. 5), the leaf spring rear bar 83 is shown (in somewhat exaggerated form) to bow convex downwardly into the recess provided by the notch 74.

As shown in FIG. 5, as the latch spring's rear bar 83 passes between the tab 59 and the carrier guard frame 43, the top side 105 of the bar 83 engages the tab end 64. Somewhat simultaneously, the latch spring's lower side 107 (FIG. 5) engages areas of the guard frame's lands 66 causing the spring to retain its bow as the wick assembly 25 is urged rearwardly until the bar 83 passes the tab 59.

As a feature of the invention, it will be noted that movement of the wick assembly 25 along the trackways 33 with the latch spring's rear bar 83 engaging the tab 59 and guard frame 43 causes an interference or frictional drag of the rear bar against the tab 59 and the guard because of the bent or deflected and canted angular attitude of the latch spring 58. This drag helps prevent inadvertent disassembly of the wick assembly 25 from the carrier 26. After the bar 83 passes the tab 59, the latch spring 58 snaps upwardly to its normal full-line position shown in FIGS. 7 and 9 and allows the tab 59 to project into the latch spring hole 80; it in effect intersects and extends beyond the normal plane of the latch spring and retains the wick assembly 25 on the carrier 26. Thus, in its latched position, the latch spring side bars 84 straddle the tab 59 inasmuch as the window opening 62 on each side of the tab is wider than the side bars 84.

The amount of resistance drag against the latch spring 58 to prevent inadvertent dislodgement of the wick assembly can be varied to some degree by the position of the tab end 64 relative to the lands 66 and notch bottom 67. In other words, the plane or level of the notch bottom 67 may be varied relative to the plane of the lands 66 and the tab end 64. Likewise the plane or level of the tab end 64 may be varied with respect to the level of the land 66.

To remove the wick assembly 25 from the carrier 26, the wedge or screw driver 101 (FIG. 5) is again inserted between the ledge 61 and the latch spring bar 83 and the spring 58 is deflected downwardly as shown by the dotted line 87 (FIG. 7) to align the end of the spring bar 83 with the space between the guard frame 43 and the tab end 64. With the latch spring bowed, urging of the wick assembly 25 forwardly away from the carrier rear wall 42 will cause the spring bar 83 to slide past the restriction provided by the tab 59 and guard frame.

As another feature of the invention, the retaining mechanism 29 (FIGS. 1, 7 and 10) also performs the vital function of controlling the amount of forward (and rearward) travel of the wick assembly 25 so that the metal wick holder 31 will not engage the axle 16 if the wick 37 is allowed to wear excessively. Forward travel is limited by the inner edge 85 (FIG. 10) of the latch spring cross bar 83 engaging the back side of tab 59. Rearward travel of the wick assembly may be limited by the front edge 86 of the latch spring opening 80 engaging the front or axle facing side of tab 59.

As a further feature of the invention, during installation (and removal) of the assembled lubricator 21 into out of the axle cap 19, the ledge 61 serves as a means (FIGS. 1, 4 and 7) to help prevent the latch spring 58 from catching the rear wall 111 of the axle cap and thereby causing inadvertent deflection of the latch spring and disassembly of the wick assembly 25. Specifically (as viewed with reference to FIG. 1), when the lubricator 21 is inserted into the axle cap inspection opening 112, the ledge 61 of the carrier generally overhangs or projects over the latch spring bar 83 and acts as a protective shield to prevent it from being bent upwardly when engaging the inspection opening rear wall 111.

Likewise, w en removing the lubricator 21, the ledge 61 will engage the rear wall 111 before the latch spring 58 and prevent it from being deflected downwardly thereby possibly unlatching the wick assembly 25 from the carrier 26. Similarly, with the guard frame 43 and ledge 61 being wider than the width of the latch spring 71, and with the guard frame window 62 somewhat encircling the transverse width of the spring, the spring will be also protected from sidewise jostling and possible inadvertent disconnection during installation. Thus, the protective means to deter inadvertent disconnection or disassembly of the wick assembly may include any combination of the guard frame 43, the frictional or interference drag of the tab 59 and guard frame 43 against the deflected latch spring 58, and the ledge 61.

Figure 3:
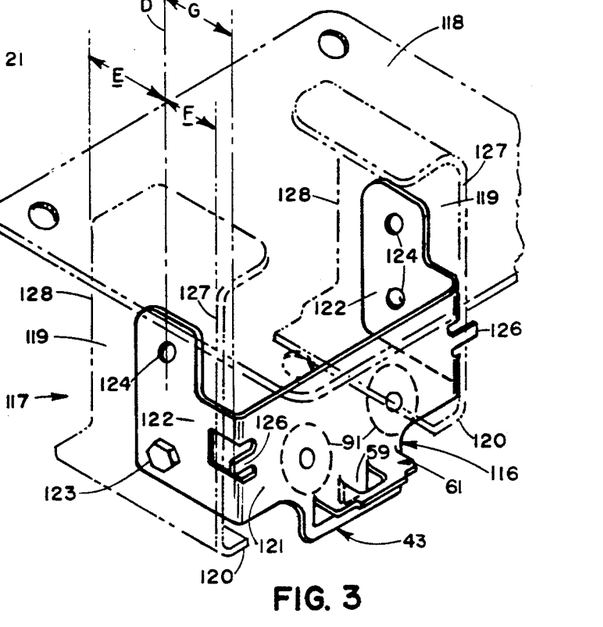
FIG. 3 is a perspective view of an embodiment of the invention which may be used to convert an older type lubricator device to one having the features of the present invention.

A further embodiment of the invention is shown in FIG. 3 wherein a novel conversion bracket or adapter means 116 is provided to convert a former torsion spring type lubricator (such as shown in U.S. Pat. Nos. 2,980,472 and 3,827,769) to the concept of the present invention. The former type carrier indicated by dotted lines 117, includes a cover plate 118 to which are riveted two spaced apart side supports or hanger members 119 having inwardly bent trackways 120.

The conversion bracket 116 includes a generally "U-shaped" member having a rear base wall or bar member 121 and forwardly extending legs 122 which nest between the insides of the carrier sides 119. Attachment of the bracket 116 is accomplished by fastening means such as bolts 123 (only one is shown) which extend through holes 124 in the bracket legs and align with corresponding holes in the carrier sides 119 which were used with the former carrier 117 for a bushing retainer pin and a spring pin as described in U.S. Pat. No. 2,980,472.

Figure 2:
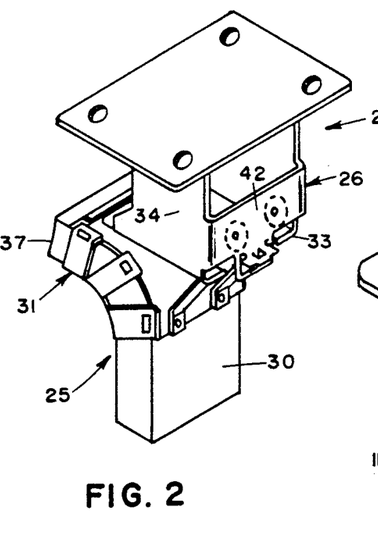
FIG. 2 is a perspective view of a lubricator device shown in FIG. 1.

The conversion bracket 116 also includes that portion of the latching means 29 carried by the wall 42 of the embodiment shown particularly in FIGS. 1, 2 and 4, that is, frame 43, tab 59, ledge 61 etc; it also includes rear spring holders 91 (indicated diagramatically) to enable the former carrier 117 po be used with the new wick assembly 25. Once converted to the concept of the present invention, a wick assembly can be quickly replaced in service without removing or replacing the many parts of the former torsion spring lubricator such as a spring bushing spool, retainer pins, etc. thus saving considerable time and improving locomotive utilization.

To assure correct mounting, the bracket 116 has ears or lugs 126 which project wider than the adapter sides 122 and at least equal to or wider than the outside width of the carrier sides 119 to provide a "non-reversing" feature. If an attempt is made to invert or reverse the insertion of the bracket and install it from the front side of the carrier 117 (from the side facing the axle 16), the lugs 126 will interfere with or contact the front edges 128 of the carrier sides and prevent the holes 124 in the bracket from aligning with the matching holes in the carrier sides. In other words, the distance from the center line "D" extending somewhat vertically through the holes 124 (FIG. 3) in the carrier sides to the front carrier-side edges 128 (indicated by "E") is greater than the distance from the centerline "D" to the carrier side rear edges 127 (indicated by "F" ) and also greater than the distance "G") from the centerline "D" to the lugs 126. When the adapter 116 is inserted correctly from the rear of the carrier, the lugs 126 do not engage or provide interference with the rear edges 127 of the carrier sides 119. On the other hand, if the adapter is installed incorrectly from the front, the lugs 126 will engage the front edges 128 of the carrier sides to prevent alignment of the holes 124 in the respective carrier sides and bracket sides.

While the invention has been illustrated and described with reference to preferred embodiments thereof, it is to be understood that the invention is not limited to the precise construction herein disclosed and the right is reserved to all changes and modifications coming within the scope of the invention as defined in the appended claims.

What we claim is:

1. A lubricator device for applying lubricant to a rotatable journal from a reservoir comprising, a support member, a trackway carried by said support member, said trackway extending transversely of the journal when the lubricator device is mounted in operative relation to the journal, a wick assembly member including a lubricator body and a slide, said wick assembly being slideably mounted on said trackway for movement toward said journal, biasing means carried by said device for urging said lubricator body toward said journal, and retaining means for holding said wick assembly member on said support member while allowing movement of said lubricator body toward said journal with a portion of said retaining means being carried by said wick assembly member and being moveable therewith and another portion of said retaining means being carried by said support member, said portion of said retaining means carried by one of said members including a deflectable means having a relieved area therein and said portion of said retaining means carried by the other of said member including a stop means complementary to said deflectable means for securing said wick assembly on said support, said deflectable means being capable of being moved from the plane of its normal position as said wick assembly member is being installed on said support trackway so as to generally deflect beyond said stop means and return to its normal position to allow said relieved area of said deflectable means to clear said stop means, said stop means being defined around a part thereof by an opening into which said deflectable means may pass.

2. A lubricator device as claimed in claim 1 wherein said opening has an entry aperture through which said deflectable means passes which is displaced from the plane of said deflectable means' normal position to require said deflectable means to enter said aperture at an angle thereto and cause said deflectable means to frictionally engage a wall area of said opening as said deflectable means moves into said aperture.

3. A lubricator device as claimed in claim 1 wherein said opening is somewhat U-shaped.

4. A lubricator device as claimed in claim 3 wherein said U-shaped opening has a lower wall area with a recessed area therein toward which said deflectable means may be urged.

5. A lubricator device as claimed in claim 4 wherein said stop means engages said deflectable means as the latter passes into said U-shaped opening and causes at least a portion of said deflectable means to move toward said recessed area.

6. A lubricator device for applying lubricant to a rotatable journal from a reservoir comprising,
   a support member,
   a trackway carried by said support member, said trackway extending transversely of the journal when the lubricator device is mounted in operative relation to the journal,
   a wick assembly member including a lubricator body and a slide, said wick assembly being slideably mounted on said trackway for movement toward said journal,
   biasing means carried by said device for urging said lubricator body toward said journal, and
   retaining means for holding said wick assembly member on said support member while allowing movement of said lubricator body toward said journal with a portion of said retaining means being carried by said wick assembly member and being moveable therewith and another portion of said retaining means being carried by said support member,
   said retaining means including deflectable means which may be distorted about an axis somewhat parallel to the direction of movement of said wick assembly along said trackway.

7. A lubricator device as claimed in claim 6 wherein said deflectable means may be distorted along axes extending somewhat transverse as well as parallel to the direction of movement of said wick assembly member.

8. A lubricator device for applying lubricant to a rotatable journal from a reservoir comprising,
   a support member,
   a trackway carried by said support member, said trackway extending transversely of the journal when the lubricator device is mounted in operative relation to the journal,
   a wick assembly member including a lubricator body and a slide, said wick assembly being slideably mounted on said trackway for movement toward said journal,
   biasing means carried by said device for urging said lubricator body toward said journal, and
   retaining means for holding said wick assembly member on said support member while allowing movement of said lubricator body toward said journal with a portion of said retaining means being carried by said wick assembly member and being moveable therewith and another portion of said retaining means being carried by said support member,
   said portion of said retaining means including a deflectable means and another portion of said retaining means including a stop means protected by a guard, and an opening is provided between said guard and said stop means.

9. A lubricator as claimed in claim 8 wherein said stop means includes a projection which is adapted to extend into a relieved area in said deflectable means and acts to limit travel of said wick assembly member by engaging a wall of said relieved area.

10. A lubricator device for applying lubricant to a rotatable journal from a reservoir comprising,
    a support member,
    a trackway carried by said support member, said trackway extending transversely of the journal when the lubricator device is mounted in operative relation to the journal,
    a wick assembly member including a lubricator body and a slide, said wick assembly being slideably mounted on said trackway for movement toward said journal,
    biasing means carried by said device for urging said lubricator body toward said journal, and
    retaining means for holding said wick assembly member on said support member while allowing movement of said lubricator body toward said journal with a portion of said retaining means being carried by said wick assembly member and being moveable therewith and another portion of said retaining means being carried by said support member,
    said retaining means including a relatively flat deflectable latch means carried by either said support member or said wick assembly member and a complementary catch means is carried by the other of said support or wick assembly members, said deflectable latch means having longitudinally extending edges and being mounted for bending about a longitudinal axis extending generally parallel to said longitudinal edges and also being capable of being bent along an axis generally transverse to said longitudinal axis, said catch means having an opening therein offset with respect to the normal operative position of said deflectable latch means so as to cause said latch means to be bent along said longitudinal and transverse axis as said wick assembly member is being mounted on said support member, said retaining means also having means for enabling said latch means to return to its normal operative position after said wick assembly is in its fully mounted position on said support member.

11. A lubricator device for applying lubricant to a rotatable journal from a reservoir comprising,
    a support member,
    a trackway carried by said support member, said trackway extending transversely of the journal when the lubricator device is mounted in operative relation to the journal,
    a wick assembly member including a lubricator body and a slide, said wick assembly being slideably mounted on said trackway for movement toward said journal,
    biasing means carried by said device for urging said lubricator body toward said journal, and
    retaining means for holding said wick assembly member on said support member while allowing movement of said lubricator body toward said journal with a portion of said retaining means being carried by said wick assembly member and being moveable therewith and another portion of said retaining means being carried by said support member,
    said device including locating emans carried by said support member for positioning said biasing means relative to said trackway, said locating means including means for piloting said biasing means onto said locating means during assembly of said wick assembly member onto said trackway.

12. A lubricator device for applying lubricant to a rotatable journal from a reservoir comprising, a support member, a tackway carried by said support member, said trackway extending transversely of the journal when the lubricator device is mounted in operative relation to the journal, a wick assembly member including a lubricator body and a slide, said wick assembly being slideably mounted on said trackway for movement toward said journal, biasing means carried by said device for urging said lubricator body toward said journal, and retaining means for holding said wick assembly member on said support member while allowing movement of said lubricator body toward said journal with a portion of said retaining means being carried by said wick assembly member and being moveable therewith and another portion of said retaining means being carried by said support member, said slide having a top surface and an abutment against which said biasing means bears is integrally formed upwardly from said top surface and extends away from said top surface and away from said trackway, and holding means are provided on said abutment for positioning said biasing means.

13. A lubricator device for applying lubricant to a rotatable journal from a reservoir comprising, a support member, a trackway carried by said support member, said trackway extending transversely of the journal when the lubricator device is mounted in operative relation to the journal, a wick assembly member including a lubricator body and a slide, said wick assembly being slideably mounted on said trackway for movement toward said journal, biasing means carried by said device for urging said lubricator body toward said journal, and retaining means for holding said wick assembly member on said support member while allowing movement of said lubricator body toward said journal with a portion of said retaining means being carried by said wick assembly member and being moveable therewith and another portion of said retaining means being carried by said support member, said retaining means including deflectable means and protective means therefore for deterring inadvertent disconnection of said wick assembly member from said support member.

14. A lubricator device as claimed in claim 13 wherein said support member has a rear wall and said protective means includes a protrusion extending at an angle to said rear wall.

15. A lubricator device for applying lubricant to a rotatable journal from a reservoir comprising, a support member, a trackway carried by said support member, said trackway extending transversely of the journal when the lubricator device is mounted in operative relation to the journal, a wick assembly member including a lubricator body and a slide, said wick assembly being slideably mounted on said trackway for movement toward said journal, biasing means carried by said device for urging said lubricator body toward said journal, and retaining means for holding said wick assembly member on said support member while allowing movement of said lubricator body toward said journal with a portion of said retaining means being carried by said wick assembly member and being moveable therewith and another portion of said retaining means being carried by said support member, said retaining means including an opening defined by a wall area, and stop means extending into said opening and spaced away from a surface of said wall area to provide a restricted aperture between said wall surface and said stop means, said retaining means also including a deflectable means which is adapted to pass through said restricted aperture, said restricted aperture causing said deflectable means to engage a portion of said wall surface and said stop means somewhat simultaneously as said deflectable means is deflected to start through said aperture to provide a resistance drag effect on said deflectable means as it passes therethrough.

16. A lubricator device for applying lubricant to a rotatable journal from a reservoir comprising, a support member, a trackway carried by said support member, said trackway extending transversely of the journal when the lubricator device is mounted in operative relation to the journal, a wick assembly member including a lubricator body and a slide, said wick assembly being slideably mounted on said trackway for movement toward said journal, biasing means carried by said device for urging said lubricator body toward said journal, and retaining means for holding said wick assembly member on said support member while allowing movement of said lubricator body toward said journal with a portion of said retaining means being carried by said wick assembly member and being moveable therewith and another portion of said retaining means being carried by said support member, said portion of said retaining means carried by said support member including a somewhat U-shaped opening defined on its outer perimeter by a lower wall area and side walls, said lower wall area having a recess therein and a land to the side of said recess at a different level than the bottom of said recess, and stop means projecting into said U-shaped opening and spaced from said lower wall area of said U-shaped opening to provide a restricted aperture between said stop means and said lower wall area.

17. A wick assembly for use with a carrier having a support including a trackway, said carrier also having a portion of a retaining means for securing said wick assembly thereto and also for locating biasing means relative to said carrier for urging said wick assembly along a defined path on said trackway, said wick assembly comprising, a slide having a rear leg, a lubricator body carried by said slide for movement along said defined path, means for positioning said biasing means relative to said wick assembly, an complementary retaining means carried by said wick assembly adapted to cooperate with said portion of said retaining means of said carrier for securing said wick assembly and carrier together.

18. A wick assembly as claimed in claim 17 wherein said complementary retaining means is carried by sadi slide in cantilever fashion and overhangs the rear leg of said slide.

19. A wick assembly as claimed in any of claims 17 or 18 wherein said complementary retaining means may be deflected so as to bow about a first axis somewhat parallel to the path of movement of said wick assembly on said carrier and also about a second axis generally transverse to said first axis.

20. A wick assembly as claimed in claims 17 or 18 wherein said complementary retaining means carried by said wick-assembly is shaped to provide a slight interference with said portion of said retaining means carried by said carrier during mounting of said wick assembly onto said carrier.

21. A wick assembly as claimed in claim 17 wherein said complementary retaining means carried by said wick assembly frictionally engages said portion of said retaining means carried by said carrier during installation of said wick assembly on said carrier.

22. A wick assembly as claimed in claim 17 wherein said complementary retaining means of said wick assembly is offset relative to said portion of said retaining means of said carrier to provide interference therebetween during installation of said wick assembly on said carrier.

23. A wick assembly as claimed in claims 17 or 18 wherein said complementary retaining means carried by said wick assembly includes a somewhat flat member having an offset therein.

24. A wick assembly as claimed in claim 23 wherein said flat member has a relieved area therein which may substantially encircle a stop means of said carrier to limit travel of said wick assembly along said carrier trackway.

25. A wick assembly as claimed in claim 17 wherein said portion of said retaining means of said carrier has an aperture therein and said complementary retaining means of the wick assembly includes a deflectable means which extends beyond the rear by said slide so as to extend into said aperture of said carrier and cooperate with said retaining means carried by said carrier.

26. A wick assembly as claimed in claims 17 wherein said means for positioning said biasing means thereon is formed on a portion of said slide.

27. A wick assembly as claimed in claim 17 wherein said means for positioning said biasing means provides an interference fit with said biasing means to retain said biasing means on said wick assembly during mounting of said assembly on said carrier.

28. A wick assembly as claimed in claim 17 wherein said slide has an abutment extending at an angle to said carrier trackway and said means for positioning said biasing means relative to said wick assembly is carried by said abutment.

29. A carrier for supporting a wick assembly used to apply oil to a rotatable journal for a traction motor suspension bearing assembly wherein an axle cap has an oil reservoir and an access opening above the reservoir, and wherein said wick assembly has a slide which is adapted to be urged by biasing means toward said journal along a predetermined path and plane as defined by said carrier, said biasing means being interposed between said carrier and said wick assembly, and wherein there is provided retaining means for holding said wick assembly and carrier together, said carrier having a support member secured to a cover plate and defining a trackway that extends transversely of the journal with the forward end of said trackway being open and facing the journal when the cover plate is applied to said access opening to close the opening and position the wick assembly in its operative relation to the journal, said retaining means including complementary means carried by said carrier which coact with a complementary portion of said retaining means carried by said wick assembly which includes deflectable latch means to hold said wick assembly on said carrier while allowing controlled movement of said wick assembly along said trackway toward and away from said journal, said complementary retaining means of said carrier including a bar member positioned to intersect the normal plane of movement of said latch means of said wick assembly along said carrier, said bar member including catch means past which a part of said latch means of said wick assembly may pass when deflected away from its normal plane and which cooperates with said latch means to retain said wick assembly on said carrier when said latch means is returned to its normal plane of movement after it passes said catch means during installation of said wick assembly on said carrier.

30. A carrier as claimed in claim 29 wherein said catch means includes an opening therein offset with respect to the normal operative position of said wick assembly's deflectable latch means so as to cause said latch means to be bent along longitudinal and transverse axis' as said wick assembly member is being mounted on said support member, said carrier's complementary retaining means also having means for enabling said latch means to return to its normal operative position after said wick assembly is in its fully mounted position on said support member.

31. A carrier as claimed in claim 29 wherein said complementary retaining means of said carrier includes protective means for deterring inadvertent disconnection of said wick assembly from said support member.

32. A carrier as claimed in claim 29 wherein said complementary retaining means of said carrier includes a somewhat U-shaped opening which is defined on its outer perimeter by a lower wall area and side walls, and wherein stop mean projects into said U-shaped opening and has an end spaced from said lower wall area of said U-shaped opening to provide a restricted aperture between said stop means and said lower wall area.

33. A carrier as claimed in claim 32 wherein said lower wall area of said U-shaped opening has a recess therein and a land to the side of said recess at a different level than the bottom of said recess.

34. A carrier as claimed in claim 33 wherein said bottom of said recess, said land and said end of said stop means are all at different levels with respect to one another.

35. A carrier as claimed in any of claims 29-34 wherein locating means are provided for positioning said biasing means relative to said trackway, said locating means including tapered means for piloting said biasing means onto said locating means during mounting of said wick assembly on said trackway.

36. An adapter for use with a carrier for a journal lubricator device wherein said carrier includes a pair of spaced hanger members having a trackway for supporting a wick assembly, and wherein said wick assembly has a portion of a retaining means for use in securing said wick assembly on said carrier, said adapter comprising, a base, at least one sidewall extending from said base and adapted to nest adjacent a hanger member and be attached thereto, said sidewall having means aligning with said hanger member to position said adapter in a predetermined position relative to said hanger member, said adapter also having a complementary portion of said retaining means for coacting with said portion of said retaining means of said wick assembly to secure said wick assembly on said carrier.

37. An adapter as claimed in claim 36 wherein said base has a pair of spaced apart sidewalls which nest with said spaced apart hanger members of said carrier.

38. An adapter as claimed in claim 36 wherein said complementary portion of said retaining means is carried by said base and includes an opening therein through which a part of said retaining means of said wick assembly may extend to secure said wick assembly on said carrier.

39. An adapter as claimed in claims 37 or 38 wherein said adapter includes stop means for limiting travel of said wick assembly on said carrier.

40. An adapter as claimed in claim 38 wherein said opening in said base is somewhat U-shaped and extends around at least a part of said stop means.

41. An adapter as claimed in claim 36 wherein said complementary portion of said retaining means is carried by said base and includes a somewhat U-shaped opening in said base defined on its outer perimeter by a lower wall area and side walls, said lower wall area having a recess therein and a land to the side of said recess at a different level than the bottom of said recess, and stop means projecting into said U-shaped opening and spaced from said lower wall area of said U-shaped opening to provide a restricted aperture between said stop means and said lower wall area.

42. An adapter as claimed in any of claims 36–38 or 40–41 wherein a protective shield extends outwardly from said base to protect a part of said retaining means of said wick assembly.

43. An adapter as claimed any of claims 36–38 or 40–44 wherein means are provided to prevent incorrect attachement of said adapter to said carrier.

44. An adapter as claimed in claim 43 wherein said means for preventing incorrect attachment of said adapter includes means disposed to provide interfering engagement with a hanger member if incorrect assembly is attempted.

45. An adapter as claimed in claim 36 wherein said base has locating means provided with means for piloting a biasing means thereon as said biasing means is moved with said wick assembly onto said carrier trackway.

46. A lubricator device for applying lubricant to a rotatable journal from a reservoir comprising, a carrier including pair of spaced apart hanger members having a trackway extending transversely of the journal when the lubricator device is mounted in operative relation to the journal, an adapted including a base having spaced sidewalls, securing means attached said sidewalls to said hanger member, a wick assembly including a lubricator body slideably mounted on said trackway for movement toward said journal, biasing means operatively connected between said wick assembly and said adapter for urging said lubricator body toward said journal, and retaining means for holding said wick assembly on said carrier trackway while allowing movement thereof toward said journal, said retaining means having a portion thereof carried by said wick assembly and being moveable therewith and another portion thereof carried by said adapter.

47. A lubricator device as claimed in claim 46 wherein said adapter sidewalls are angularly disposed with respect to said base for attachement to a hanger member, each sidewall having a hole therein which is adapted to align with a corresponding hole in said hanger members and through which said securing means extends to secure said adapter to said hanger member.

* * * * *